(12) United States Patent
Mizuno

(10) Patent No.: US 7,075,050 B2
(45) Date of Patent: Jul. 11, 2006

(54) PHOTODETECTOR INCLUDING INTEGRATION CAPACITANCE SECTION AND A/D CONVERTER CIRCUIT

(75) Inventor: Seiichiro Mizuno, Shizuoka (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/481,084

(22) PCT Filed: Jun. 14, 2002

(86) PCT No.: PCT/JP02/05981

§ 371 (c)(1),
(2), (4) Date: Dec. 17, 2003

(87) PCT Pub. No.: WO02/103308

PCT Pub. Date: Dec. 27, 2002

(65) Prior Publication Data

US 2004/0169128 A1      Sep. 2, 2004

(30) Foreign Application Priority Data

Jun. 18, 2001   (JP) .............................. 2001-183482

(51) Int. Cl.
    *G01T 1/24*       (2006.01)
(52) U.S. Cl. ................................. 250/214 R
(58) Field of Classification Search ............ 250/214 R, 250/214 LS, 214 A, 214 G, 214 DC, 208.1; 341/161
    See application file for complete search history.

(56) References Cited

U.S. PATENT DOCUMENTS 5,510,789 A * 4/1996 Lee ............................. 341/120

6,163,029 A * 12/2000 Yamada ................. 250/370.09

FOREIGN PATENT DOCUMENTS

| JP | 58-205331 | 11/1983 |
|----|-----------|---------|
| JP | 61-049562 | 3/1986 |
| JP | 63-141434 | 9/1988 |
| JP | 4-1421 | 1/1992 |
| JP | 06-273230 | 9/1994 |
| JP | 07-294333 | 11/1995 |
| JP | 2000-310561 | 11/2000 |
| JP | 2001-119525 | 4/2001 |

OTHER PUBLICATIONS

International Application No. PCT/JP02/05981 International Preliminary Examination Report (English Translation).

* cited by examiner

*Primary Examiner*—Thanh X. Luu
*Assistant Examiner*—Tony Ko
(74) *Attorney, Agent, or Firm*—Drinker, Biddle & Reath LLP

(57) ABSTRACT

An integration circuit 10 comprises: an amplifier and an integration capacitance section arranged in parallel to each other between an input terminal and an output terminal; and capacitance value switching means for switching the capacitance value of the integration capacitance section into any one of $Cf_1$ through $Cf_K$; and inputs electric charge output from a photodiode PD, so as to accumulate the electric charge into the integration capacitance section, so as to output an integration voltage having a value corresponding to the amount of the accumulated electric charge. An A/D converter circuit 20 comprises reference voltage switching means for switching a reference voltage used in A/D conversion, into any one of $V_{ref,1}$ through $V_{ref,L}$, and inputs the integration voltage output from the integration circuit 10, so as to A/D-convert the integration voltage on the basis of the reference voltage switched and set to be by the reference voltage switching means, so as to output a digital value corresponding to the integration voltage.

2 Claims, 4 Drawing Sheets

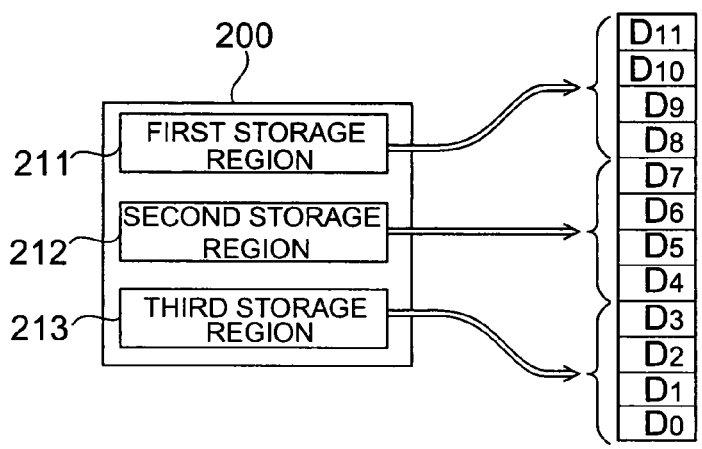
Fig.4A  Fig.4B
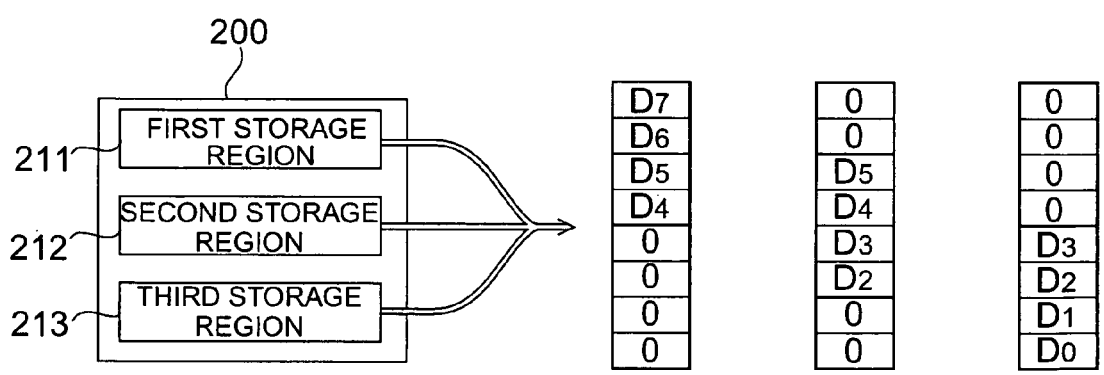
Fig.5A  Fig.5B  Fig.5C  Fig.5D

US 7,075,050 B2

PHOTODETECTOR INCLUDING INTEGRATION CAPACITANCE SECTION AND A/D CONVERTER CIRCUIT

FIELD OF THE INVENTION

The present invention relates to a photodetector comprising an A/D converter circuit for converting an analog value into a digital value.

BACKGROUND ART

A photodetector comprises a photodetection element or a plurality of photodetection elements. The electric charge output from each photodetection element is integrated by an integration circuit, so that the integration result is output as a voltage. In a certain photodetector, the analog value of this voltage is converted into a digital value (A/D conversion), so that the digital value is output. When the voltage exceeds a predetermined value in this A/D conversion, the digital value output as a result of the A/D conversion of the voltage is saturated at a value corresponding to the predetermined value. This causes a problem where accurate photodetection is not achieved. Thus, in the prior art, the above-mentioned predetermined value is set to be an expected maximum value or larger in order to prevent the saturation.

On the other hand, it is desired to expand the range of the analog value (that is, dynamic range) that can be A/D-converted without saturation. Several techniques for this have been proposed. For example, a technique is known where the dynamic range is expanded using logarithmic compression. In this logarithmic compression technique, a photodiode (photodetection element) and a MOS transistor are connected. Then, when the electric potential of the connection point between these two components is denoted by "V," and when the electric current flowing from the photodiode to the MOS transistor is denoted by "I," the relational expression $I = A \cdot \exp(q(V-V_{th})/kT)$ holds and is used. Here, "A" indicates a proportional constant; "q" indicates the amount of electric charge of the electron; "$V_{th}$" indicates the threshold voltage of the MOS transistor; "k" indicates Boltzmann's constant; and "T" indicates the absolute temperature. As seen from this relational expression, for a low incident light intensity (that is, for a small I), a large change is caused in the output voltage V by a change in the incident light intensity. On the contrary, for a high incident light intensity (that is, for a large I), a small change is caused in the output voltage V by a change in the incident light intensity. By virtue of this, the dynamic range is expanded.

DISCLOSURE OF THE INVENTION

However, in this logarithmic compression technique, the I-V characteristic depends on the temperature T as seen from the above-mentioned relational expression. This causes a problem where a change in the temperature T results in a change in the signal level. Furthermore, for a low incident light intensity (that is, for a small I), a large change is caused in the output voltage V by a change in the incident light intensity. Thus, the dark current is amplified notably and affects the output voltage V. This causes the problem of an additional change in the signal level. Furthermore, the MOS transistor has its own threshold voltage $V_{th}$, the different transistor has the different value, and causes the problem of another additional change in the signal level.

The invention has been devised in order to resolve the above-mentioned problems. An object of the invention is to provide a photodetector in which the dynamic range is expanded while a change in the signal level caused by the above-mentioned reasons is prevented.

A photodetector according to the invention comprises: (1) a photodetection element for outputting electric charge in an amount corresponding to incident light intensity; (2) an integration circuit which is provided with: an amplifier and an integration capacitance section arranged in parallel to each other between an input terminal and an output terminal; and capacitance value switching means for switching the capacitance value of the integration capacitance section into any one of first through K-th capacitance values (where K indicates an integer greater than or equal to 2); and which inputs electric charge output from the photodetection element through the input terminal, so as to accumulate the electric charge into the integration capacitance section having the capacitance value switched into by the capacitance value switching means, so as to output through the output terminal a voltage corresponding to the amount of accumulated electric charge; and (3) an A/D converter circuit which is provided with reference voltage switching means for switching a reference voltage used in A/D conversion, into any one of first through L-th reference voltages (where L indicates an integer greater than or equal to 2), and which inputs the voltage output through the output terminal of the integration circuit, so as to A/D-convert the voltage on the basis of the reference voltage switched and set to be by the reference voltage switching means, so as to output a digital value corresponding to the voltage.

According to this photodetector, electric charge in an amount corresponding to the light intensity incident on the photodetection element is output from the photodetection element to the integration circuit, and then accumulated in the integration capacitance section of the integration circuit. The integration circuit outputs a voltage corresponding to the amount of electric charge accumulated in the integration capacitance section, so that the voltage is A/D-converted by the A/D converter circuit. The A/D converter circuit outputs a digital value corresponding to the voltage. For a high incident light intensity, the capacitance value of the integration capacitance section of the integration circuit is switched into a large value among the first through K-th capacitance values by the capacitance value switching means, while the reference voltage used in the A/D conversion of the A/D converter circuit is switched into a large value among the first through L-th reference voltages by the reference voltage switching means. This permits the detection of incident light intensity without saturation. In contrast, for a low incident light intensity, the capacitance value of the integration capacitance section of the integration circuit is switched into a small value among the first through K-th capacitance values by the capacitance value switching means, while the reference voltage used in the A/D conversion of the A/D converter circuit is switched into a small value among the first through L-th reference voltages by the reference voltage switching means. This suppresses a change in the signal level caused by dark current, and hence permits high-sensitivity detection of the incident light intensity.

In the photodetector according to the invention, it is preferable that when the k-th capacitance value among the first through K-th capacitance values is denoted by $Cf_k$, the relational expression $Cf_1 > Cf_2 > \ldots > Cf_k > \ldots > Cf_{K-1} > Cf_K$ holds, while when the l-th reference voltage among the first through L-th reference voltages is denoted by $V_{ref,1}$, the relational expression $V_{ref,1} > V_{ref,2} > \ldots > V_{ref,l} > \ldots > V_{ref,L-1} > V_{ref,L}$ holds. The photodetector according to the invention further comprises: (1) a storage section which is provided with first through K-th storage regions and storage region switching means for switching the region into any one of these regions, and which stores the digital value output from the A/D converter circuit, into any storage region switched into and selected from the first through K-th storage regions by the storage region switching means; and (2) controlling means which controls the capacitance value switching means of the integration circuit, the reference voltage switching means of the A/D converter circuit, and the storage region switching means of the storage section, so as to set the capacitance value of the integration capacitance section of the integration circuit to be the k-th capacitance value $Cf_k$, set the reference voltage of the A/D converter circuit to be the l-th reference voltage $V_{ref,l}$, and store the digital value output from the A/D converter circuit into the k-th storage region.

In this case, under the control of the controlling means, the capacitance value of the integration capacitance section of the integration circuit is set to be the k-th capacitance value $Cf_k$, while the reference voltage of the A/D converter circuit is set to be the first reference voltage $V_{ref,1}$. Then, the digital value output from the A/D converter circuit is stored into the k-th storage region of the storage section (k=1 through K). On the basis of the digital values stored, respectively, in the K storage regions of the storage section, the intensity of the light received by the photodetection element is detected with no saturation even for a high intensity and with high sensitivity even for a low intensity.

In the photodetector according to the invention, it is preferable that a plurality of photodetection elements are provided and arranged in two dimensions of M rows by N columns (M≧2, N≧2), while an integration circuit and an A/D converter circuit are arranged for each column of the photodetection elements arranged in two dimensions.

In this case, an optical image is acquired by a plurality of the photodetection elements arranged in two dimensions of M rows by N columns. At that time, the capacitance value of the integration capacitance section of the integration circuit and the reference voltage of the A/D converter circuit are set appropriately for each pixel. As a result, the light intensity in each pixel of the acquired optical image is detected with no saturation even for a high intensity and with high sensitivity even for a low intensity.

BRIEF DESCRIPTION OF THE DRAWINGS

FIG. 4A is a block diagram showing a storage section 200.

FIG. 4B is a diagram illustrating a 12-bit digital value output from a storage section 200.

FIG. 5A is a block diagram showing a storage section 200.

FIG. 5B, FIG. 5C, and FIG. 5D are diagrams illustrating an 8-bit digital value output from a storage section 200.

BEST MODE FOR CARRYING OUT THE INVENTION

Figure 1:
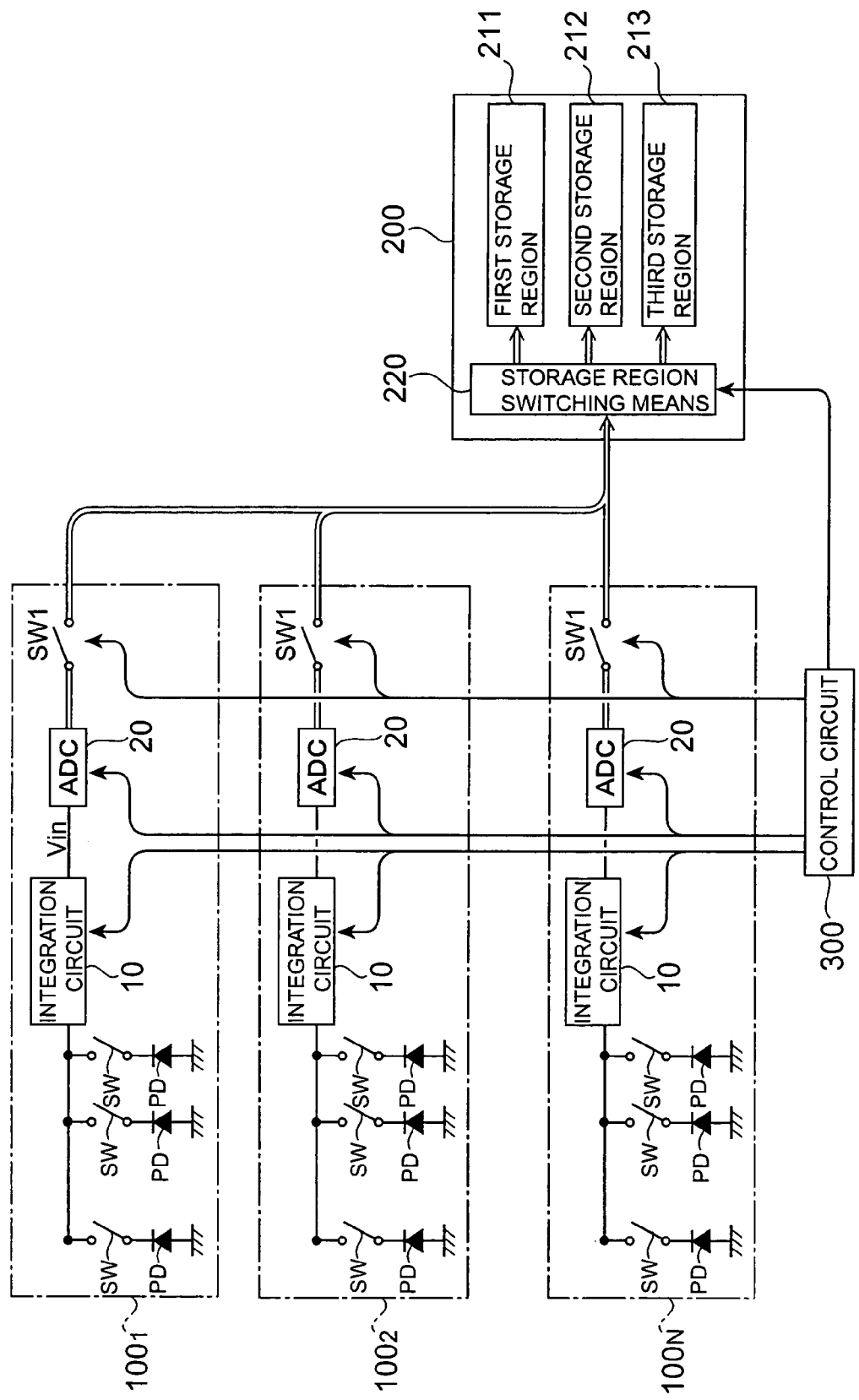
FIG. 1 is a schematic configuration diagram showing a photodetector 1 according to an embodiment.

Embodiments of the invention are described below in detail with reference to the attached drawings. Herein, like components are designated by like reference numerals, so that duplicated description is omitted.

FIG. 1 is a schematic configuration diagram showing a photodetector 1 according to an embodiment. This photodetector 1 comprises N units $100_1$–$100_N$ (N is an integer greater than or equal to 2), a storage section 200, and a control circuit 300. Each unit $100_n$ (n is an arbitrary integer greater than or equal to 1 and smaller than or equal to N) comprises: M sets (M is an integer greater than or equal to 2) of photodiodes (photodetection elements) PD and switches SW; an integration circuit 10; an A/D converter circuits 20; and a switch SW1. The anode terminal of each photodiode PD is grounded, while the cathode terminal is connected through the switch SW to the integration circuit 10. When a corresponding switch SW is closed, each photodiode PD outputs electric charge in an amount corresponding to the incident light intensity, to the integration circuit 10.

Figure 2:
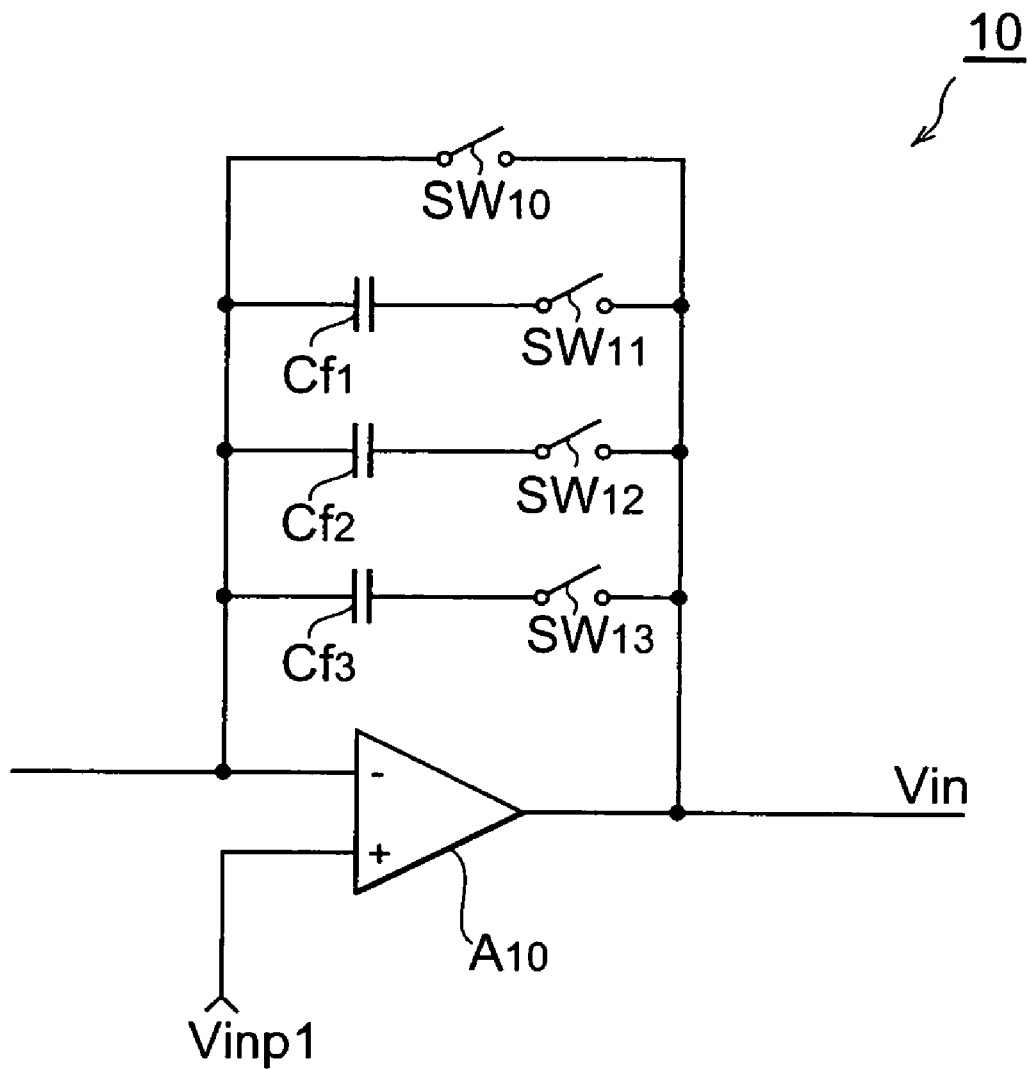
FIG. 2 is a circuit diagram showing an integration circuit 10 of a photodetector 1 according to an embodiment.

FIG. 2 is a circuit diagram showing the integration circuit 10 of the photodetector 1 according to this embodiment. The integration circuit 10 of each unit $100_n$, comprises an amplifier $A_{10}$, capacitors $Cf_1$–$Cf_3$, and switches $SW_{10}$–$SW_{13}$. In the amplifier $A_{10}$, a standard voltage $V_{inp1}$ is input through a non-inverting input terminal, while an inverting input terminal is connected through a switch SW to the cathode terminal of the photodiode PD. The switch $SW_{10}$, a serial connection of the capacitor $Cf_1$ and the switch $SW_{11}$, a serial connection of the capacitor $Cf_2$ and the switch $SW_{12}$, and a serial connection of the capacitor $Cf_3$ and the switch $SW_{13}$ are arranged in parallel to each other between the inverting input terminal and the output terminal of the amplifier $A_{10}$.

The open and close operation of each of the switches $SW_{10}$–$SW_{13}$ is controlled by the control circuit 300. The capacitance values of the capacitors $Cf_1$–$Cf_3$ differ from each other. When the capacitance value of the capacitor $Cf_1$ is denoted by $Cf_1$, and so on, the following relational expression holds.

$$Cf_1 > Cf_2 > Cf_3 \tag{1}$$

The capacitors $Cf_1$–$Cf_3$ serve as components constituting an integration capacitance section the capacitance value of which is variable. The switches $SW_{11}$–$SW_{13}$ serve as capacitance value switching means for switching the capacitance value of the integration capacitance section in to any value. That is, when the switch $SW_{11}$ among the switches $SW_{11}$–$SW_{13}$ is solely closed, the capacitance value of the integration capacitance section equals the capacitance value $Cf_1$ of the capacitor $Cf_1$. When the switch $SW_{12}$ is solely closed, the capacitance value of the integration capacitance section equals the capacitance value of the capacitor $Cf_2$. When the switch $SW_{13}$ is solely closed, the capacitance value of the integration capacitance section equals the capacitance value of the capacitor $Cf_3$. The integration circuit 10 inputs the electric charge output from the photodiode PD, so as to accumulate the electric charge into the integration capacitance section having any one of the capacitance values $Cf_1$–$Cf_3$, so as to output through the output terminal an integration voltage corresponding to the amount of the accumulated electric charge. When closed, the switch $SW_{10}$ discharges the electric charge accumulated in the capacitor $Cf_1$–$Cf_3$, so as to reset the output level of the integration circuit 10.

Figure 3:
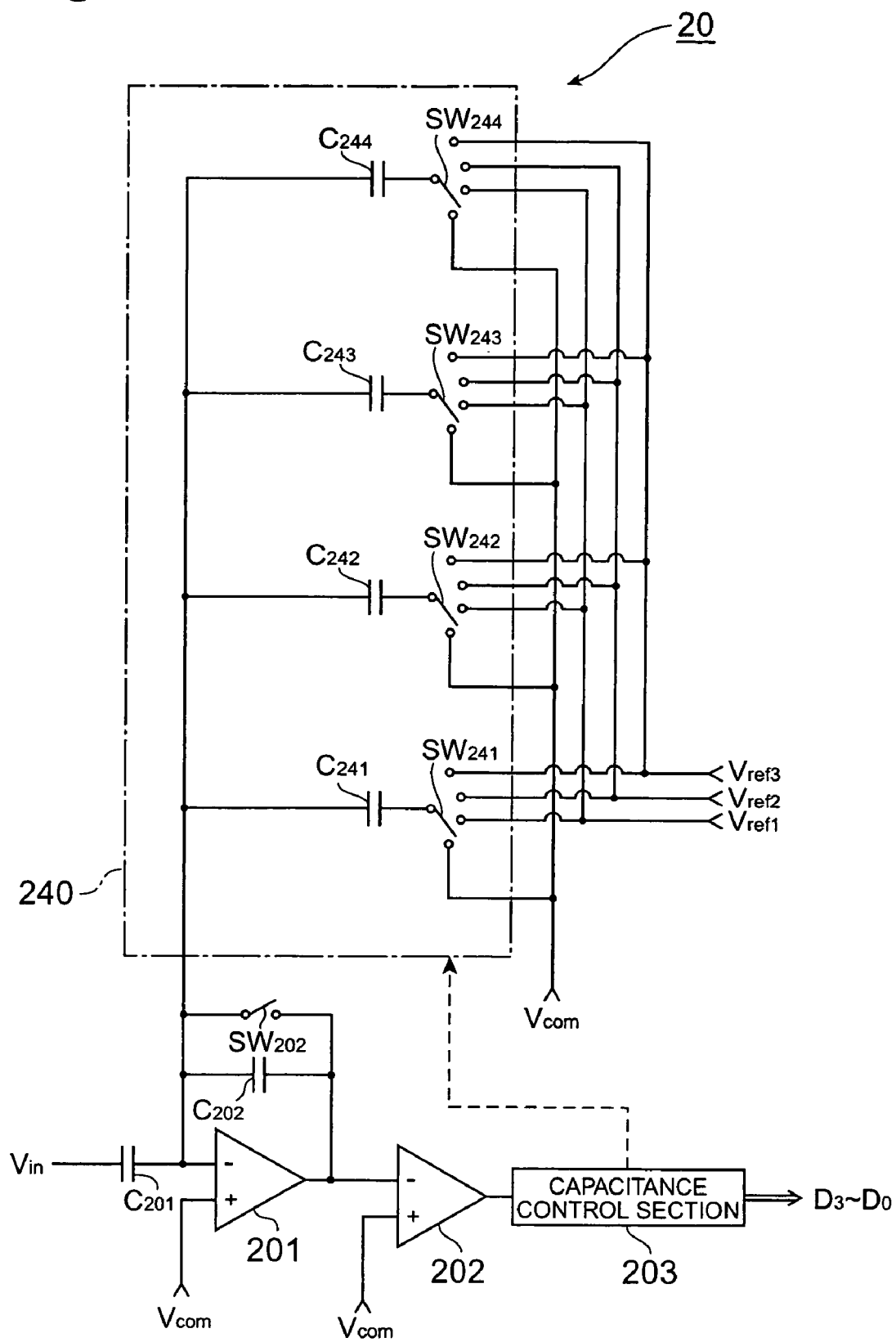
FIG. 3 is a circuit diagram showing an A/D converter circuit 20 of a photodetector 1 according to an embodiment.

FIG. 3 is a circuit diagram showing the A/D converter circuit 20 of the photodetector 1 according to this embodiment. The A/D converter circuit 20 of each unit $100_n$ comprises a coupling capacitor $C_{201}$, a feedback capacitor $C_{202}$, a switch $SW_{202}$, an amplifier 201, a comparator 202, a capacitance control section 203, and a variable capacitance section 240.

In the amplifier 201, the integration voltage (analog value) output from the integration circuit 10 is input through the inverting input terminal via the coupling capacitor $C_{201}$, while a standard voltage $V_{com}$ is input through the non-inverting input terminal. The feedback capacitor $C_{202}$ is arranged between the inverting input terminal and the output terminal of the amplifier 201, so as to store electric charge corresponding to the input voltage. The switch $SW_{202}$ is arranged between the inverting input terminal and the output terminal of the amplifier 201. When being open, the switch $SW_{202}$ causes the feedback capacitor $C_{202}$ to accumulate electric charge. When being closed, the switch $SW_{202}$ resets the electric charge accumulation in the feedback capacitor $C_{202}$. Then, the amplifier 201 outputs a voltage corresponding to the amount of electric charge accumulated in the feedback capacitor $C_{202}$, through the output terminal to the comparator 202. In the comparator circuit 202, the voltage output from the amplifier 201 is input through the inverting input terminal, while the standard voltage $V_{com}$ is input through the non-inverting input terminal, so that these two input values are compared to each other, so that a signal indicating the comparison result is output to the capacitance control section 203.

The variable capacitance section 240 comprises four capacitors $C_{241}$–$C_{244}$ and four switches $SW_{241}$–$SW_{244}$ (voltage switching means). One end of the capacitor $C_{241}$ is connected to the inverting input terminal of the amplifier 201, while the other end is connected through the switch $SW_{241}$ to any one of reference voltages $V_{ref1}$, $V_{ref2}$, and $V_{ref3}$ and the standard voltage $V_{com}$. One end of the capacitor $C_{242}$ is connected to the inverting input terminal of the amplifier 201, while the other end is connected through the switch $SW_{242}$ to any one of the reference voltages $V_{ref1}$, $V_{ref2}$, and $V_{ref3}$ and the standard voltage $V_{com}$. One end of the capacitor $C_{243}$ is connected to the inverting input terminal of the amplifier 201, while the other end is connected through the switch $SW_{243}$ to any one of the reference voltages $V_{ref1}$, $V_{ref2}$, and $V_{ref3}$ and the standard voltage $V_{com}$. One end of the capacitor $C_{244}$ is connected to the inverting input terminal of the amplifier 201, while the other end is connected through the switch $SW_{244}$ to any one of the reference voltages $V_{ref1}$, $V_{ref2}$, and $V_{ref3}$ and the standard voltage $V_{com}$.

The capacitance values of the capacitors in the variable capacitance section 240, as well as the coupling capacitor $C_{201}$ and the feedback capacitor $C_{202}$, satisfy the following relational expressions.

$$C_{201} = C_{202} = 16C \tag{2a}$$

$$C_{241} = 8C \tag{2b}$$

$$C_{242} = 4C \tag{2c}$$

$$C_{243} = 2C \tag{2d}$$

$$C_{244} = C \tag{2e}$$

Here, C indicates a certain constant capacitance value. Furthermore, the reference voltages $V_{ref1}$, $V_{ref2}$, and $V_{ref3}$ and the standard voltage $V_{com}$ supplied to the variable capacitance section 240 satisfy the following relational expressions.

$$V_{ref2} - V_{com} = (V_{ref1} - V_{com})/16 \tag{3a}$$

$$V_{ref3} - V_{com} = (V_{ref2} - V_{com})/16 \tag{3b}$$

In general, the standard voltage $V_{com}$ is set to be the ground potential. Thus, $V_{com} = 0$ is assumed hereinafter. In this case, the above-mentioned Equations (3) are rewritten into the following relational expressions.

$$V_{ref1}/V_{ref2} = 16 \tag{4a}$$

$$V_{ref2}/V_{ref3} = 16 \tag{4b}$$

The reference voltages $V_{ref1}$, $V_{ref2}$, and $V_{ref3}$ and the standard voltage $V_{com}$ are supplied, for example, from a resistance dividing circuit (not shown).

The capacitance control section 203 and the switches $SW_{241}$–$SW_{244}$ serve as reference voltage switching means for switching the reference voltage used in A/D conversion, into any one of $V_{ref1}$, $V_{ref2}$, and $V_{ref3}$, and are controlled by the control circuit 300. The capacitance control section 203 stores the switching status in each of these four switches, so as to output a 4-bit digital value on the basis of the switching status and the signal output from the comparator 202. The A/D converter circuit 20 inputs the integration voltage output from the output terminal of the integration circuit 10, so as to A/D-convert this voltage on the basis of the reference voltage (any one of $V_{ref1}$, $V_{ref2}$, and $V_{ref3}$) switched and set to be by the reference voltage switching means, so as to output a digital value.

As shown in FIG. 1, the storage section 200 comprises a first storage region 211, a second storage region 212, a third storage region 213, and storage region switching means 220. The storage region switching means 220 selects any one of the first storage region 211, the second storage region 212, the third storage region 213, so as to store the digital value output from the A/D converter circuit 20 of each unit $100_n$ via the switch SW1, into the selected storage region.

The control circuit 300 controls the capacitance value switching means of the integration circuit 10, the reference voltage switching means of the A/D converter circuit 20, and the switch SW1 in each unit $100_n$, and also controls the storage region switching means 220 of the storage section 200. More specifically, the control circuit 300 closes the switch $SW_{1k}$ solely among the switches $SW_{11}$–$SW_{13}$ of the integration circuit 10, so as to set the capacitance value of the integration capacitance section to be $Cf_k$. The control circuit 300 further sets the reference voltage in the A/D converter circuit 20 to be $V_{refk}$, and then stores the digital value output from the A/D converter circuit 20 into the k-th storage region 21k.

The operation of the photodetector 1 according to the present embodiment is described below. A series of operations of the photodetector 1 is separated into four stages.

In the first stage under the control of the control circuit 300, in the integration circuit 10 of each unit $100_n$, the switch $SW_{11}$ is closed solely among the switches $SW_{11}$–$SW_{13}$, so as to set the capacitance value of the integration capacitance section to be $Cf_1$. Then, the switch $SW_{10}$ is closed temporarily so as to reset the output level of the integration circuit 10. After that, the switch $SW_{10}$ is opened. Furthermore, under the control of the control circuit 300, in the A/D converter circuit 20 of each unit $100_n$, the switch $SW_{202}$ is closed temporarily so as to discharge the feedback capacitor $C_{202}$. After that, the switch $SW_{202}$ is opened. In the initial state, each of the switches $SW_{241}$–$SW_{244}$ of the A/D converter circuit 20 is switched into the standard voltage $V_{com}$. Furthermore, under the control of the control circuit 300, the reference voltage in the A/D converter circuit 20 is set to be $V_{ref1}$, while the first storage region 211 is selected by the storage region switching means 220 of the storage section 200.

In each unit $100_n$, the electric charge output through the switch SW from the photodiode PD on which light is incident is input to the integration circuit 10, so as to be accumulated in the capacitor $Cf_1$, so that a voltage $V_{in}$ $(=Q_0/Cf_1)$ corresponding to the amount of the accumulated electric charge $Q_0$ is output from the integration circuit 10. The voltage $V_{in}$ output from the integration circuit 10 is input to the A/D converter circuit 20. In the A/D converter circuit 20, electric charge in an amount corresponding to the voltage $V_{in}$ output from the integration circuit 10 is accumulated in the feed back capacitor $C_{202}$. The amount of electric charge Q accumulated in the feedback capacitor $C_{202}$ satisfies the following relational expression.

$$Q = C_{202} \cdot V_{in} = 16C \cdot V_{in} \quad (5)$$

After that, the process of actual A/D conversion begins. In each of the four switches $SW_{241}$–$SW_{244}$ in the variable capacitance section 240, switching operation is performed between the reference voltage $V_{refl}$ and the standard voltage $V_{com}$. First, the switch $SW_{241}$ corresponding to the capacitor $C_{241}$ having the largest capacitance value among the four capacitors $C_{241}$–$C_{244}$ is switched into the reference voltage $V_{refl}$. As a result, an amount of electric charge $Q_{241}$ which is expressed by the following equation and which is a part of the amount of electric charge Q (above-mentioned Equation (5)) accumulated in the feed back capacitor $C_{202}$ is transferred to the capacitor $C_{241}$.

$$Q_{241} = C_{241} \cdot V_{refl} = 8C \cdot V_{refl} \quad (6)$$

Furthermore, an amount of electric charge $Q_{202}$ which is expressed by the following equation and which is a part of the amount of electric charge Q (above-mentioned Equation (5)) accumulated in the feedback capacitor $C_{202}$ remains in the feedback capacitor $C_{202}$.

$$Q_{202} = 16C \cdot V_{in} - 8C \cdot V_{refl} \quad (7)$$
$$= 16C(V_{in} - V_{refl}/2)$$

Then, the amplifier 201 outputs the voltage $V_{in} - V_{refl}/2$. The comparator 202 compares the voltage $V_{in} - V_{refl}/2$ input from the amplifier 201 to the inverting input terminal with the standard voltage $V_{com}$ (=0) input to the non-inverting input terminal, so as to determine the sign of the voltage $V_{in} - V_{refl}/2$. The result is input to the capacitance control section 203, so as to be stored as the value of the highest bit $D_3$ to be output. That is, when the voltage $V_{in} - V_{refl}/2$ is positive, $D_3 = 1$ is stored. Otherwise, $D_3 = 0$ is stored.

When the voltage $V_{in} - V_{refl}/2$ is positive, the switch $SW_{242}$ corresponding to the capacitor $C_{242}$ having the next largest capacitance value is switched into the reference voltage $V_{refl}$. As a result, an amount of electric charge $Q_{242}$ which is expressed by the following equation and which is a part of the amount of electric charge $Q_{202}$ (Equation (9)) accumulated at that time in the feedback capacitor $C_{202}$ is transferred to the capacitor $C_{242}$.

$$Q_{242} = C_{242} \cdot V_{refl} = 4C \cdot V_{refl} \quad (8)$$

Furthermore, an amount of electric charge $Q_{202}$ which is expressed by the following equation and which is a part of the amount of electric charge $Q_{202}$ (Equation (9)) accumulated at that time in the feedback capacitor $C_{202}$ remains in the feedback capacitor $C_{202}$.

$$Q_{202} = 16C(V_{in} - V_{refl}/2) - 4C \cdot V_{refl} \quad (9)$$
$$= 16C(V_{in} - 3V_{refl}/4)$$

Then, the amplifier 201 outputs the voltage $V_{in} - 3V_{refl}/4$. The comparator 202 compares the voltage $V_{in} - 3V_{refl}/4$ input from the amplifier 201 to the inverting input terminal with the standard voltage $V_{com}$ (=0) input to the non-inverting input terminal, so as to determine the sign of the voltage $V_{in} - 3V_{refl}/4$. The result is input to the capacitance control section 203, so as to be stored as the value of the bit $D_2$ to be output. That is, when the voltage $V_{in} - 3V_{refl}/4$ is positive, $D_2 = 1$ is stored. Otherwise, $D_2 = 0$ is stored.

When the voltage $V_{in} - 3V_{refl}/4$ is positive, the switch $SW_{243}$ corresponding to the capacitor $C_{243}$ having the next largest capacitance value is switched into the reference voltage $V_{refl}$. As a result, an amount of electric charge $Q_{243}$ which is expressed by the following equation and which is a part of the amount of electric charge $Q_{202}$ (above-mentioned Equation (7)) accumulated at that time in the feedback capacitor $C_{202}$ is transferred to the capacitor $C_{243}$.

$$Q_{243} = C_{243} \cdot V_{refl} = 2C \cdot V_{refl} \quad (10)$$

Furthermore, an amount of electric charge $Q_{202}$ which is expressed by the following equation and which is a part of the amount of electric charge $Q_{202}$ (above-mentioned Equation (7)) accumulated at that time in the feedback capacitor $C_{202}$ remains in the feedback capacitor $C_{202}$.

$$Q_{202} = 16C(V_{in} - V_{refl}/4) - 2C \cdot V_{refl} \quad (11)$$
$$= 16C(V_{in} - 7V_{refl}/8)$$

Then, the amplifier 201 outputs the voltage $V_{in} - 7V_{refl}/8$. The comparator 202 compares the voltage $V_{in} - 7V_{refl}/8$ input from the amplifier 201 to the inverting input terminal with the standard voltage $V_{com}$ (=0) input to the non-inverting input terminal, so as to determine the sign of the voltage $V_{in} - 7V_{refl}/8$. The result is input to the capacitance control section 203, so as to be stored as the value of the bit $D_1$ to be output. That is, when the voltage $V_{in} - 7V_{refl}/8$ is positive, $D_1 = 1$ is stored. Otherwise, $D_1 = 0$ is stored.

On the contrary, when the voltage $V_{in} - V_{refl}/2$ is negative in the determination of the value of the highest bit $D_3$, the switch $SW_{241}$ is returned to the standard voltage $V_{com}$, while the amount of electric charge Q (above-mentioned Equation (5)) is entirely returned to the feedback capacitor $C_{202}$. After that, the switch $SW_{242}$ corresponding to the capacitor $C_{242}$ having the next largest capacitance value is switched into the reference voltage $V_{refl}$. As a result, an amount of electric charge $Q_{242}$ which is expressed by the following equation and which is a part of the amount of electric charge Q (above-mentioned Equation (5)) accumulated in the feedback capacitor $C_{202}$ is transferred to the capacitor $C_{242}$.

$$Q_{242} = C_{242} \cdot V_{refl} = 4C \cdot V_{refl} \quad (12)$$

Furthermore, an amount of electric charge $Q_{202}$ which is expressed by the following equation and which is a part of the amount of electric charge Q (above-mentioned Equation (5)) accumulated in the feedback capacitor $C_{202}$ remains in the feedback capacitor $C_{202}$.

$$Q_{202} = 16C \cdot V_{in} - 4C \cdot V_{refl} \quad (13)$$
$$= 16C(V_{in} - V_{refl}/4)$$

Then, the amplifier 201 outputs the voltage $V_{in} - V_{refl}/4$. The comparator 202 compares the voltage $V_{in} - V_{refl}/4$ input from the amplifier 201 to the inverting input terminal with the standard voltage $V_{com}$ (=0) input to the non-inverting input terminal, so as to determine the sign of the voltage $V_{in}-V_{ref1}/4$. The result is input to the capacitance control section 203, so as to be stored as the value of the bit $D_2$ to be output. That is, when the voltage $V_{in}-V_{ref1}/4$ is positive, $D_2=1$ is stored. Otherwise, $D_2=0$ is stored.

As such, the switching statuses of the four switches $SW_{241}-SW_{244}$ in the variable capacitance section 240 are determined successively, so that the values of the bits $D_3-D_0$ are determined successively.

The above-mentioned operation is performed in parallel in each of the N units $100_1-100_N$. Then, the switch SW1 of each unit $100_n$ is closed successively, so that the digital value $(D_3-D_0)$ output from the A/D converter circuit 20 of each unit $100_n$ is stored in the first storage region 211 of the storage section 200. Furthermore, the above-mentioned operation is performed in parallel in each of the M photodiodes PD of each unit $100_n$. As such, in the first stage, the capacitance value of the integration capacitance section of the integration circuit 10 is set to be $Cf_1$, while the reference voltage of the A/D converter circuit 20 is set to be $V_{ref1}$, so that the digital value corresponding to the incident light intensity of each of the photodiodes PD arranged in M rows by N columns is stored in the first storage region 211 of the storage section 200.

The second stage following the first stage is almost the same as that of the first stage described above. The difference is that the capacitance value of the integration capacitance section of the integration circuit 10 is set to be $Cf_2$, while the reference voltage of the A/D converter circuit 20 is set to be $V_{ref2}$, so that the digital value corresponding to the incident light intensity of each of the photodiodes PD arranged in M rows by N columns is stored in the second storage region 212 of the storage section 200. Furthermore, the third stage following the second stage is almost the same as that of the first stage described above. The difference is that the capacitance value of the integration capacitance section of the integration circuit 10 is set to be $Cf_3$, while the reference voltage of the A/D converter circuit 20 is set to be $V_{ref3}$, so that the digital value corresponding to the incident light intensity of each of the photodiodes PD arranged in M rows by N columns is stored in the third storage region 213 of the storage section 200.

At the time of completion of the third stage, the digital values, respectively, stored in the first storage region 211, the second storage region 212, and the third storage region 213 of the storage section 200 are of 4-bit data. However, since the capacitance value of the integration capacitance section of the integration circuit 10 is different in each stage, and since the reference voltage of the A/D converter circuit 20 is different in each stage, the digital values stored in the storage regions are different from each other.

For example, when the reference voltages in the A/D converter circuit 20 satisfy the above-mentioned relational expressions of Equations (4), and when the capacitance values of the capacitors of the integration circuit 10 satisfy the following relational expressions, the digital value stored in the first storage region 211 is positioned higher than the digital value stored in the second storage region 212 by 4 bits.

$$Cf_1/Cf_2=16 \quad (14a)$$

$$Cf_2/Cf_3=16 \quad (14b)$$

Furthermore, the digital value stored in the second storage region 212 is positioned higher than the digital value stored in the third storage region 213 by 4 bits. However, when any bit of the 4-bit digital value $(D_3-D_0)$ stored in the second storage region 212 has a value of 1, the 4-bit digital value stored in the third storage region 213 is saturated. Furthermore, when any bit of the 4-bit digital value $(D_3-D_0)$ stored in the first storage region 211 has a value of 1, the 4-bit digital values stored in the second storage region 212 and the third storage region 213 are saturated.

Thus, in the fourth stage following the third stage, the 12-bit digital value $(D_{11}-D_0)$ output from the storage section 200 corresponding to each of the photodiodes arranged in M rows by N columns is determined on the basis of the 4-bit digital values $(D_3-D_0)$, respectively, stored in the first storage region 211, the second storage region 212, and the third storage region 213 of the storage section 200. That is, when any bit of the 4-bit digital value $(D_3-D_0)$ stored in the second storage region 212 has a value of 1, the values of all bits of the 4-bit digital value stored in the third storage region 213 are set to be 0. Furthermore, when any bit of the 4-bit digital value $(D_3-D_0)$ stored in the first storage region 211 has a value of 1, the values of all bits of the 4-bit digital value stored in the second storage region 212 are set to be 0.

FIG. 4A is a block diagram showing the storage section 200. FIG. 4B is a diagram illustrating a 12-bit digital value output from the storage section 200.

As shown in FIG. 4A and FIG. 4B, the 4-bit digital value $(D_3-D_0)$ stored in the first storage region 211 is output as the highest 4 bits $(D_{11}-D_8)$ of the 12-bit digital value $(D_{11}-D_0)$ output from the storage section 200. The 4-bit digital value $(D_3-D_0)$ stored in the second storage region 212 is output as the middle 4 bits $(D_7-D_4)$ of the 12-bit digital value $(D_{11}-D_0)$ output from the storage section 200. The 4-bit digital value $(D_3-D_0)$ stored in the third storage region 213 is output as the lowest 4 bits $(D_3-D_0)$ of the 12-bit digital value $(D_{11}-D_0)$ output from the storage section 200.

As described above, the photodetector 1 according to the present embodiment always uses the charge-voltage conversion operation of the integration circuit 10 in the process of converting the photocurrent into a voltage and further into a digital value. That is, the integration circuit 10 is composed of an amplifier $A_{10}$ having a high open-loop gain and a feedback capacitor. When the feedback capacitance value is denoted by Cf, and when the amount of electric charge accumulated in the feedback capacitor is denoted by Q, the relation "output voltage Vout=Q/Cf" always holds for the case where the open-loop gain is sufficiently high in the amplifier $A_{10}$. This feedback capacitor is fabricated by laminating insulators composed of oxide films or the like, and hence has no substantial temperature dependence. This ensures the relational expression Vout=Q/Cf under any temperature environment. As such, the final digital converted value has only a small temperature dependence by nature. This is an essential difference from the prior art where the logarithmic compression scheme is dominated by temperature characteristics.

Furthermore, in the prior art logarithmic compression scheme, the relation is nonlinear. This causes a problem, for example, where the dark current component is enhanced undesirably in the amplification. In contrast, in the present embodiment, the above-mentioned relation of the charge amplifier is always used. This ensures a linear relation in the final digital output value for the photocurrent. This prevents the problem where the dark current component is enhanced undesirably in the amplification.

The capacitance values of the capacitors of the integration circuit 10 may be those satisfying the following relational expressions in place of the above-mentioned Equations (14).

$$Cf_1/Cf_2=4 \quad (15a)$$

$$Cf_2/Cf_3=4 \quad (15b)$$

In this case, the digital value stored in the first storage region 211 is positioned higher than the digital value stored in the second storage region 212 by 2 bits. Furthermore, the digital value stored in the second storage region 212 is positioned higher than the digital value stored in the third storage region 213 by 2 bits. Thus, in the fourth stage following the third stage, an 8-bit digital value ($D_7$–$D_0$) is output from the storage section 200 corresponding to each of the photodiodes arranged in M rows by N columns on the basis of the 4-bit digital values ($D_3$–$D_0$), respectively, stored in the first storage region 211, the second storage region 212, and the third storage region 213 of the storage section 200.

FIG. 5A is a block diagram showing the storage section 200. FIG. 5B, FIG. 5C, and FIG. 5D are diagrams illustrating the 8-bit digital value output from the storage section 200.

That is, when any one of the highest two bits $D_3$ and $D_2$ of the 4-bit digital value ($D_3$–$D_0$) stored in the first storage region 211 has a value of 1, the 4-bit digital value ($D_3$–$D_0$) stored in the first storage region 211 is output as the highest 4 bits ($D_7$–$D_4$) of the 8-bit digital value ($D_7$–$D_0$) output from the storage section 200, as shown in FIG. 5B. The value 0 is output as the remaining bits of the 8-bit digital value ($D_7$–$D_0$) output from the storage section 200.

When both of the highest two bits $D_3$ and $D_2$ of the 4-bit digital value ($D_3$–$D_0$) stored in the first storage region 211 have a value of 0, and when any one of the highest two bits $D_3$ and $D_2$ of the 4-bit digital value ($D_3$–$D_0$) stored in the second storage region 212 has a value of 1, the 4-bit digital value ($D_3$–$D_0$) stored in the second storage region 212 is output as the middle 4bits ($D_5$–$D_2$) of the 8-bit digital value ($D_7$–$D_0$) output from the storage section 200, as shown in FIG. 5C. The value 0 is output as the remaining bits of the 8-bit digital value ($D_7$–$D_0$) output from the storage section 200.

When both of the highest two bits $D_3$ and $D_2$ of the 4-bit digital value ($D_3$–$D_0$) stored in the first storage region 211 have a value of 0, and when both of the highest two bits $D_3$ and $D_2$ of the 4-bit digital value ($D_3$–$D_0$) stored in the second storage region 212 have a value of 0, the 4-bit digital value ($D_3$–$D_0$) stored in the third storage region 213 is output as the lowest 4 bits ($D_3$–$D_0$) of the 8-bit digital value ($D_7$–$D_0$) output from the storage section 200, as shown in FIG. 5D. The value 0 is output as the remaining bits of the 8-bit digital value ($D_7$–$D_0$) output from the storage section 200.

As such, in comparison with the case where the capacitance values of the capacitors of the integration circuit 10 satisfy the above-mentioned Equations (14), in this case where Equations (15) are satisfied, the total number of bits of the digital value output from the photodetector 1 is smaller. However, advantageously, the number of effective bits is always 3 or more.

The invention is not limited to the above-mentioned embodiments, and maybe implemented in various modifications. In general, the capacitance value of the integration capacitance section of the integration circuit 10 may be switched into any one of $Cf_1$–$Cf_K$, while the reference voltage in the A/D converter circuit 20 may be switched into any one of $V_{ref,1}$–$V_{ref,L}$. Furthermore, the storage section 200 may comprise K storage regions (each of K and L is an integer greater than or equal to 2). Furthermore, it is preferable that $Cf_1 > Cf_2 > \ldots > Cf_k > \ldots > Cf_{K-1} > Cf_K$ and that $V_{ref,1} > V_{ref,2} > \ldots > V_{ref,l} > \ldots > V_{ref,L-1} > V_{ref,L}$. Furthermore, it is preferable that when the number of bits of the digital value output from the A/D converter circuit 20 is denoted by B, the following relational expressions hold.

$$2 \le Cf_k/Cf_{k+1} \le 2^B \quad (16a)$$

$$V_{ref,k}/V_{ref,k+1} = 2^B \quad (16b)$$

(wherein, $1 \le k < K$, $K \ge 2$)

In the above-mentioned embodiments, the number B of bits of the digital value output from the A/D converter circuit 20 has been 4. However, the invention is not limited to this.

INDUSTRIAL APPLICABILITY

The invention is applicable to a photodetector comprising an A/D converter circuit for converting an analog value into a digital value.

What is claimed is:

1. A photodetector, comprising:
a photodetection element for outputting electric charge in an amount corresponding to incident light intensity;
an integration circuit having:
 an amplifier,
 an integration capacitance section arranged in parallel to said amplifier between an input terminal and an output terminal, and
 capacitance value switching means for switching the capacitance value of said integration capacitance section into any one of first through K-th capacitance values, where K indicates an integer greater than or equal to 2,
wherein integration circuit inputs electric charge output from said photodetection element through said input terminal, so as to accumulate said electric charge into said integration capacitance section having the capacitance value switched into by said capacitance value switching means, so as to output through said output terminal a voltage corresponding to the amount of the accumulated electric charge; and
an A/D converter circuit having
reference voltage switching means for switching a reference voltage used in A/D conversion, into any one of first through L-th reference voltages, where L indicates an integer greater than or equal to 2, wherein said reference voltage is applied to a plurality of capacitors connected in parallel to a line that is connected to an input terminal of a comparator,
wherein said A/D converter circuit which inputs the voltage output through said output terminal of said integration circuit, so as to A/D-convert said voltage on the basis of the reference voltage switched and set to be by said reference voltage switching means, so as to output a digital value corresponding to said voltage,
wherein when the k-th capacitance value among said first through K-th capacitance values is denoted by $Cf_k$, the relational expression $Cf_1 > Cf_2 > \ldots > Cf_k > \ldots > Cf_{K-1} > Cf_K$ holds, while when the l-th reference voltage among said first through L-th reference voltages is denoted by $V_{ref,l}$, the relational expression $V_{ref,1} > V_{ref,2} > \ldots > V_{ref,l} > \ldots > V_{ref,L-1} > V_{ref,L}$ holds, and wherein said photodetector further comprises:
a storage section which is provided with first through K-th storage regions and storage region switching means for switching the region into any one of these regions, and which stores the digital value output from said A/D converter circuit, into any storage region switched into and selected from said first through K-th storage regions by said storage region switching means; and controlling means which controls said capacitance value switching means of said integration circuit, said reference voltage switching means of said A/D converter circuit, and said storage region switching means of said storage section, so as to set the capacitance value of said integration capacitance section of said integration circuit to be the k-th capacitance value $Cf_k$, set the reference voltage of said A/D converter circuit to be the l-th reference voltage $V_{ref,l}$, and store the digital value output from said A/D converter circuit into the k-th storage region.

2. A photodetector according to claim 1, wherein a plurality of said photodetection elements are provided and arranged in two dimensions of M rows by N columns, where $M \geq 2$ and $N \geq 2$, while said integration circuit and said A/D converter circuit are arranged for each column of said photo detection elements arranged in two dimensions.

* * * * *